United States Patent [19]
Rees

[11] 3,717,226
[45] Feb. 20, 1973

[54] DISC BRAKE, ACTUATOR, AND RESILIENT RETAINING MEANS

[75] Inventor: John Robert Rees, Halesowen, England

[73] Assignee: Girling Limited, Tyseley, Birmingham, England

[22] Filed: Feb. 12, 1971

[21] Appl. No.: 114,791

[30] Foreign Application Priority Data

Feb. 19, 1970    Great Britain.....................7,991/70

[52] U.S. Cl.....................188/71.4, 188/72.2, 192/70
[51] Int. Cl...............................................F16d 55/04
[58] Field of Search ......188/71.3, 71.4, 72.2; 197/70

[56] References Cited

UNITED STATES PATENTS

| 3,203,507 | 8/1965 | Bond | 188/71.4 |
| 3,318,420 | 5/1967 | Adams | 188/72.2 |

*Primary Examiner*—George E. A. Halvosa
*Attorney*—Scrivener Parker Scrivener & Clarke

[57]              ABSTRACT

In a brake of the spreading disc type in which relative angular movement of the pressure plates to initiate the application of the brake is effected by push-rods of which the outer ends are in rocking engagement with lugs on the pressure plates and the inner ends are received in pockets in the cam, the push-rods are resiliently urged into the pockets by pre-stressed spring clips engaging the push-rods.

3 Claims, 7 Drawing Figures

PATENTED FEB 20 1973 3,717,226
SHEET 1 OF 3

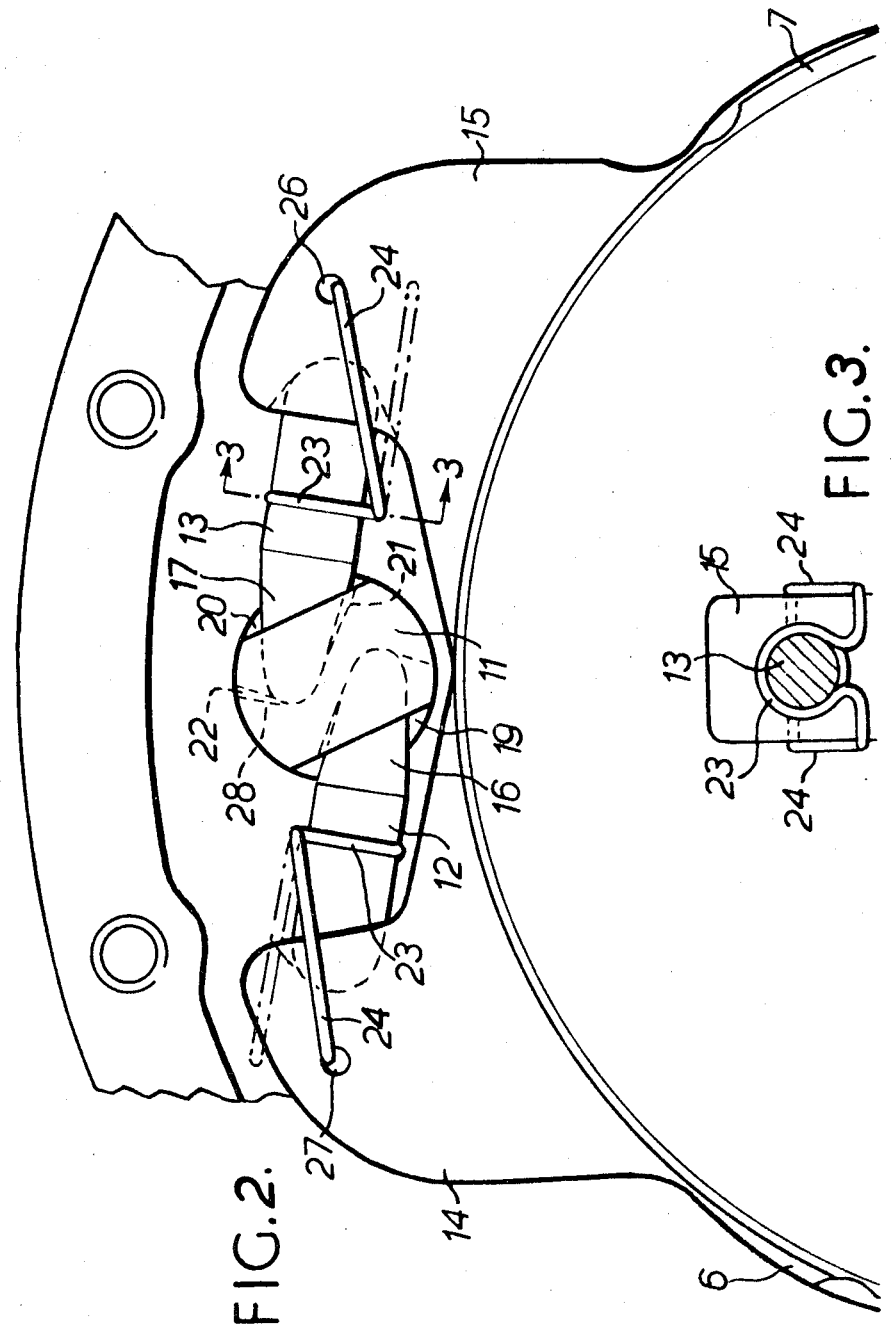

DISC BRAKE, ACTUATOR, AND RESILIENT RETAINING MEANS

This invention relates to improvements in disc brakes of the kind in which rotatable friction discs are adapted to be brought into engagement with opposed radial surfaces in a stationary housing by pressure plates located between the friction discs. Balls are located in cooperating oppositely inclined recesses in the adjacent faces of the pressure plates and the application of the brake is initiated by moving the pressure plates angularly in opposite directions, the pressure plates then moving apart into engagement with the friction discs which are urged into engagement with the radial surfaces in the housing. The pressure plates are carried round with the friction discs until one is arrested by the engagement of a lug on the plate with a stop aubtment in the housing and the continued angular movement of the other pressure plate provides a servo action.

According to our invention, in a disc brake of that kind the angular movement of the pressure plates in opposite directions to initiate the application of the brake is effected by a cam through push-rods of which the outer ends are in rocking engagement with radially projecting lugs on the pressure plates and the inner ends are received in pockets in the cam, and each push-rod is engaged by a resilient clip which biasses it in a direction to retain its inner end in its pocket in the cam.

Each clip is conveniently arranged to embrace a push-rod and to be engaged in a stressed condition with the lug on the pressure plate between which the cam the tappet or push-rod is located.

This arrangement has the advantages that it prevents any risk of the push-rod dropping out of the pocket in the cam which could happen in the event of excessive angular movement of the cam in the reverse direction, and it allows the angular dimension of the pocket in the cam to be increased so that the cam can safely be rotated through a greater angle with consequent greater maximum separation of the lugs on the pressure plates. This allows the use of thicker friction linings and a longer working life of the brake if there is room within the housing to increase the axial length of the brake assembly.

One practical embodiment of our invention and a modification are illustrated by way of example in the accompanying drawings in which:

FIG. 2 is an end elevation of the actuating mechanism and the adjacent parts of the pressure plates;

FIG. 3 is a fragmentary section on the line 3—3 of FIG. 2;

Figure 4:
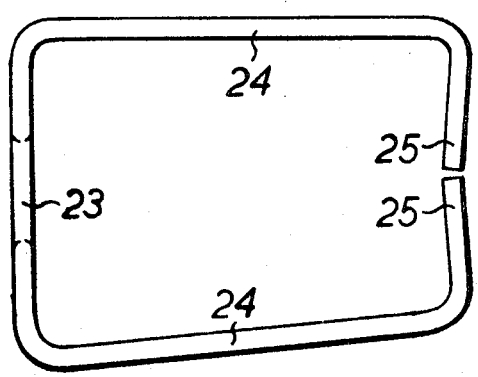
FIG. 4 is a plan of a spring clip.

In the brake illustrated 1, 2 are brake discs splined or otherwise slidably keyed on a rotatable shaft (not shown) passing axially through a stationary housing 3. The housing comprises a bell-shaped member closed at the open end by a detachable end plate 4. The discs carry rings or pads 5 of friction material for engagement with plane inner faces of the housing and end plate and with the outer faces of cooperating pressure plates 6, 7 located between the discs.

Balls 8 are located in complementary conical or inclined recesses 9 in the adjacent faces of the pressure plates so that when there is relative angular movement between the pressure plates they are urged apart to grip the rotatable discs frictionally between the pressure plates and the housing.

Relative angular movement between the pressure plates to initiate the application of the brake is produced by partial rotation of a camshaft 10 rotatably mounted in the housing with its axis parallel to that of the camshaft and carrying or incorporating a cam part 11 which acts through push-rods 12, 13 on lugs 14, 15 extending radially from the pressure plates.

After frictional contact of the pressure plates with the brake discs has been made the pressure plates tend to be carried round with the discs until one pressure plate is arrested by a stop and the other continues to move angularly so that a servo action is produced in the known manner.

The other ends of the push-rods 12, 13 are part-spherical and are received in complementary recesses in the lugs 14, 15 and the inner ends of the push-rods terminate in tapered noses 16, 17. The nose of the push-rod 12 is received in a pocket 19 in the cam 11 on its radially inner side and the nose of the push-rod 13 is received in a similar pocket 20 in the cam on its radially outer side.

The cam is rotated in a clockwise direction from the position shown in FIG. 2 to apply the brake, and to accommodate the inner end of the right-hand push-rod 13 as the cam moves angularly, the pocket 20 for that push-rod is of the substantially L-shaped form shown in FIG. 2 with a long bottom face 21 inclined at a small angle to the horizontal and a shorter upper face 22 inclined at a small angle to the vertical.

Figure 5:
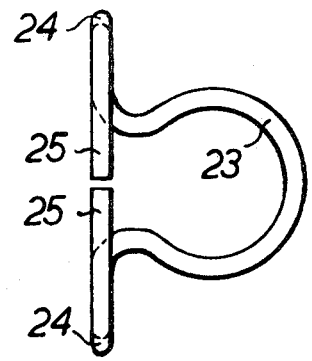
FIG. 5 is an end view of the clip.
Figure 6:
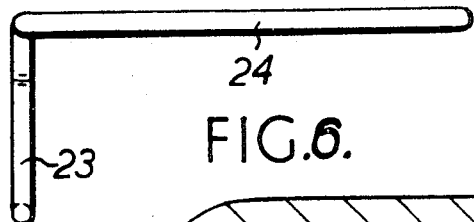
FIG. 6 is a side elevation of the clip.
Figure 1:
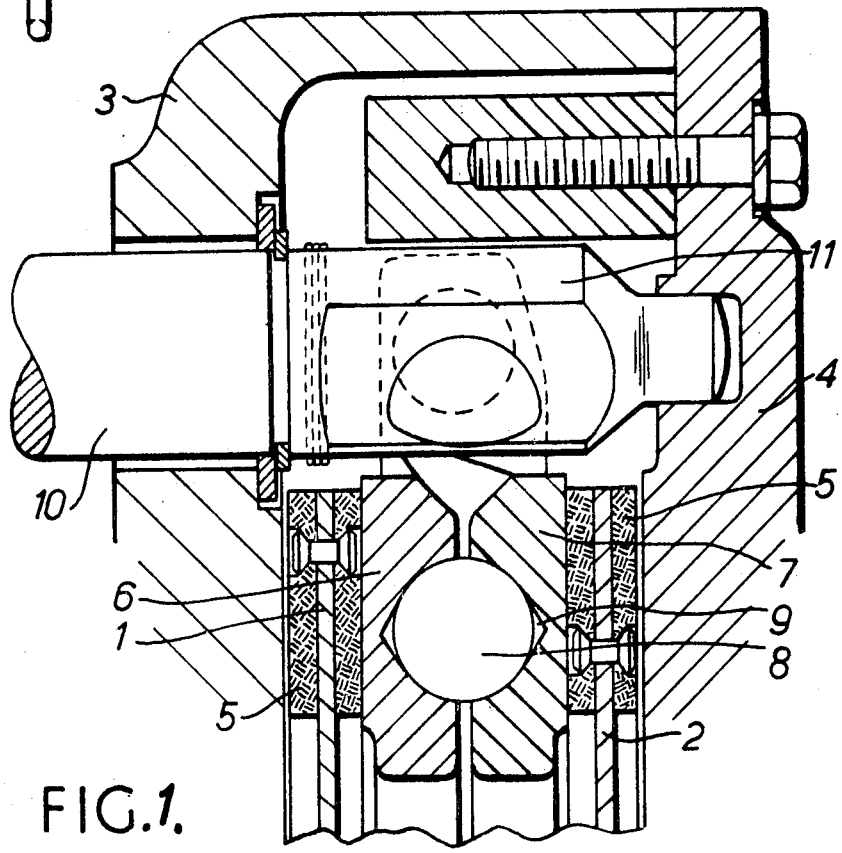
FIG. 1 is a section of a part of a brake of the kind set forth showing the actuating mechanism, the section being taken in a radial plane containing the axis of the brake.

To prevent any risk of the push-rod coming out of the pocket it is biased against the bottom face of the pocket by a spring clip shown in detail in FIGS. 4, 5, and 6. The clip is made from a length of spring wire and the wire is first formed at the center of its length into a part-circular loop 23 of such a diameter as to fit snugly into an annular groove in a push-rod.

The ends are extended a short distance in the plane of the loop and then are bent outwardly and then bent again to form two parallel limbs 24 lying in a plane at right angles to the plane of the loop. Finally the extremities of the limbs are bent inwardly to form two aligned fingers 25 at right angles to the limbs 24. The spacing between the limbs 24 is substantially equal to the thickness of a lug on a pressure plate.

In assembling the mechanism the loop on the clip is fitted over the push-rod and as the push-rod is fitted into position the limbs 24 of the clip are fitted over the lug 15 on the pressure plate 7. In their free state the limbs are in the position shown in dotted lines in FIG. 2 and they are pressed outwardly and the fingers 25 are engaged in a hole 26 in the lug. The clip is then under stress and maintains a bias on the push-rod pressing its inner end downwardly into the pocket.

A similar clip is fitted to the push-rod 12 and the limbs of that clip are engaged in a hole 27 in the lug 14, the clip being biassed to urge the inner end of the push-rod upwardly into the pocket 19 in the cam.

As the clips hold the inner ends of the push-rod into the pockets in the cam the angular dimensions of the pockets can be increased as indicated by the dotted line 26 in FIG. 2 to allow greater angular movement of the cam.

Figure 7:
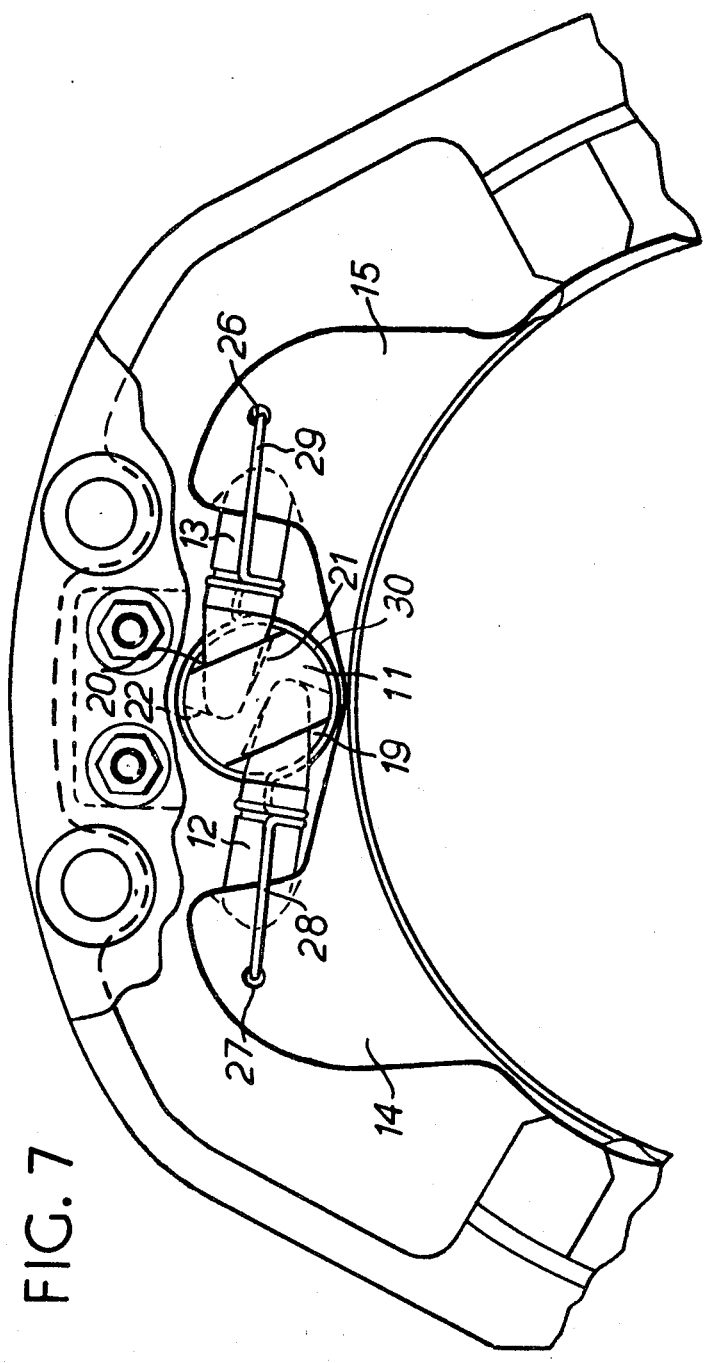
FIG. 7 is a view similar to FIG. 1 but showing a modified form of clip.

In the modification shown in FIG. 7 two clips 28, 29 each engaging one of the push-rods and the corresponding lug on a pressure plate are formed from opposite ends of a single length of resilient wire of which the central part is formed into a coil 30 fitting around the cam. Each of the clips so formed has a single stressed limb lying on one side of the lug.

The mechanism otherwise is the same as shown in FIG. 2 and the same reference numerals have been applied to corresponding parts.

I claim:

1. A disc brake of the kind in which rotatable friction discs are brought into engagement with opposed surfaces in a stationary housing by axial separation of cooperating pressure plates located between the friction discs, balls being housed in complementary inclined recesses in the adjacent faces of the pressure plates, and on application of the brake the pressure plates move angularly with the friction discs until one plate is arrested by a stop, the other plate continuing to move angularly to produce a servo action, and relative angular movement between the plates to initiate the application of the brake is effected by a cam through push-rods of which the outer ends are in rocking engagement with radially projecting lugs on the pressure plates and the inner ends are received in substantially L-shaped pockets in the cam, each of said pockets having a long face and a short face substantially perpendicular to said long face, means for retaining the inner ends of each of said push-rods in engagement with said long face of each of said pockets comprising a resilient clip having at one end looped part embracing a push-rod, a limb integral with said looped part and extending towards a lug engaged by the outer end of said push-rod in a plane angularly related to the plane of the looped part, an inturned finger at the end of said limb remote from said looped part and received in an opening in said lug, said opening for said finger being disposed on said lug relative to said push rod that when said finger is engaged in said opening said clip in its position of use is at all times pre-stressed to bias the inner ends of its push-rod into its pocket in said cam.

2. A disc brake as in claim 1 wherein the looped parts of both clips are integrally connected together by a coil embracing said cam.

3. A disc brake as in claim 1 including a second limb parallel to the first mentioned limb, both of said limbs lying in a plane angularly related to the plane of the looped part, said second limb having an inturned finger at the end thereof remote from said loop and received in an opening in said lug.

* * * * *